United States Patent [19]
Fahrbach

[11] 3,766,517
[45] Oct. 16, 1973

[54] APPARATUS FOR MEASURING THE SPEED OF FLOWING MEDIA

[75] Inventor: Kurt Erich Fahrbach, Wiesbaden-Schierstein, Germany

[73] Assignee: Siemens Aktiengesellschaft, Erlangen, Germany

[22] Filed: Jan. 10, 1972

[21] Appl. No.: 216,832

Related U.S. Application Data
[63] Continuation of Ser. No. 849,812, Aug. 13, 1969, abandoned.

[52] U.S. Cl. .............................. 340/3 D, 73/194 A
[51] Int. Cl. ........................... G01s 9/66, G01p 5/00
[58] Field of Search ............................ 340/3 D, 5 S; 73/194 A

[56] References Cited
UNITED STATES PATENTS
1,864,638 6/1932 Chilowsky .......................... 340/3 D
3,097,526 7/1963 Fischbacher ........................ 340/5 S
3,554,030 1/1971 Peronneau .......................... 340/3 D Primary Examiner—Richard A. Farley
Attorney—Richards & Geier

[57] ABSTRACT

Apparatus for measuring the speed of media flowing in conduits is specifically concerned with the measuring of the speed of blood flowing in its channels. The apparatus is using ultrasound according to the Doppler principle method and is particularly characterized in that it has a double measuring system each containing a separate sender-receiver and that the two measuring systems are combined in such manner that the senders-receivers contained therein have sending-receiving directions which form an angle of 90°.

2 Claims, 3 Drawing Figures

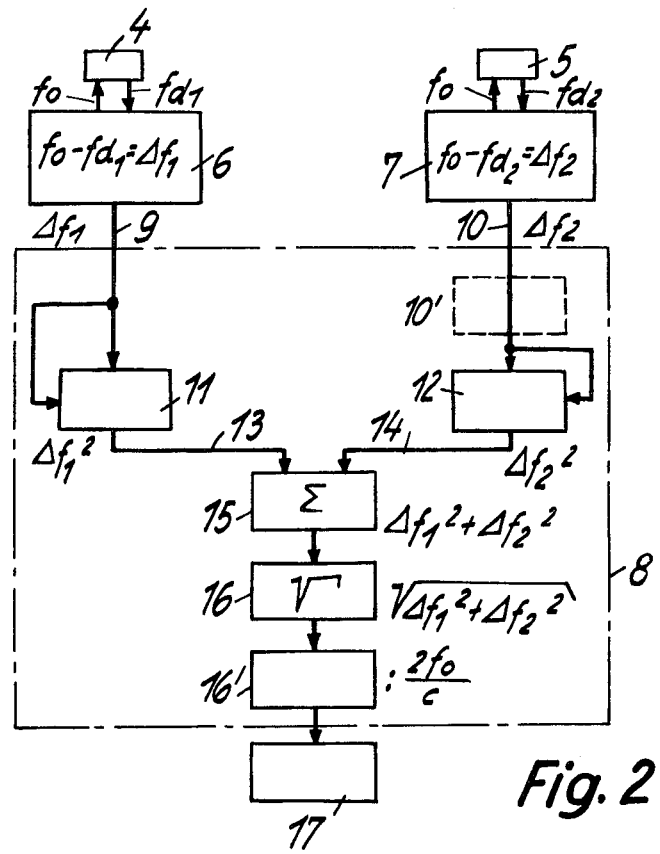
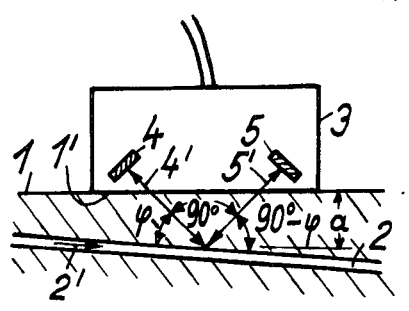
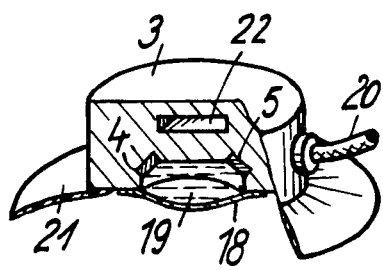
Fig. 2
Fig. 1
Fig. 3
INVENTOR:
K. E. Fahrbach

APPARATUS FOR MEASURING THE SPEED OF FLOWING MEDIA

This is a continuation of application Ser. No. 849,812 filed Aug. 13, 1969 and now abandoned.

This invention relates to an apparatus for measuring the speed of media flowing in conduits, more particularly the speed of blood flowing in its channels, by the use of ultrasound according to the Doppler principle method. The invention is particularly concerned with a measuring instrument containing an ultrasound sending and receiving system which consists of an ultrasound sender and receiver. The terms "sender" and "receiver" as used herein are meant to describe an electro-acoustic converter consisting of barium titanate or the like.

The magazine Ultrasonics in its January 1966 issue, page 22, described a known measuring device of this type wherein the instrument is directed at an angle $\phi$ to the blood vessel being examined. The frequency shifting $\Delta f$ taking place on the ground of the Doppler principle between the emitted ultrasound frequency $f_o$ and the received frequency $f_d$ reflected by the flowing blood corpuscles, amounts in the first approximation to $\Delta f = (2vf_o/c) \cos \phi$, whereby $f_o$ is the sender frequency, $v$ is the speed of the flowing blood, $c$ is the speed of sound spreading and $\phi$ is the angle of incidence of ultrasound. $\Delta f$ is the measurable quantity for the speed which is to be determined, since all other quantities are known. It appears from the above equation for $\Delta f$ that if the incidence of the sender energy is a perpendicular one (namely, when $\phi = 90$ and cos $\phi = 0$), no measurement is possible and that in order to obtain a precise speed measurement it is essential to have a precise determination and a precise maintenance of the angle. However, in actual practice it is hardly possible to comply with this requirement and then only with great difficulties and great expenditure. Thus, for example, blood vessels in a human body change their location in the surrounding tissues under the action of blood pulsations (in a manner similar to that of a freely lying garden hose when water is turned on). Thus the known instrument could be used to produce quantitatively usable results only if measurements took place in connection with previously freed and fixed conduits. On the other hand, the measuring of the speed of blood flow should be carried out quickly, simply and without endangering the patient by average workers having no special knowledge.

An object of the present invention is the provision of means for solving this problem.

Other objects of the present invention will become apparent in the course of the following specification.

The present invention accomplishes this objective despite the fact that the equation $\Delta f = (2vf_o/c) \cos \phi$ apparently does not provide any possibility for a precise determination of the speed $V$ unless the angle $\phi$ is also precisely determined and maintained, which, as stated above, is not easily possible.

According to the present invention a double measuring device is provided and the two measuring devices are so combined that the sending-receiving directions of the senders-receivers contained therein form an angle of 90°.

The present invention is based on the following considerations:

One sender emits with the frequency $f_o$ and its related receiver receives with the frequency $f_{d1}$. The difference in frequency $\Delta f_1 = f_o - f_{d1}$ corresponds to the above indicated formula for $\Delta f$. The other receiver receives ultrasound energy emitted by the other sender after its refection by the flowing blood corpuscles with the frequency $f_{d2}$. The frequency break $\Delta f_2$ between the sending frequency $f_o$ of the second sender (which should have the same sending frequency as the first sender) and $f_{d2}$ then amounts to $(2vf_o/c)\cos(90°-\phi)$, due to the shifting to the extent of 90° of the arrangement of the measurers. If measurements are taken simultaneously or practically simultaneously with both measurers, then $v$ (up to the direction) is always the same and the expression $2vf_o/c$ is a constant one, merely equal to k. Then $\Delta f_1 = kx\cos \phi$; and $\Delta f_2 = -kx\cos(90°-\phi)$ (there is minus k here since the speed $v$ for the second measurer has a reverse direction from that of the first measurer).

The two results $\Delta f_1$ and $\Delta f_2$ can be calculated as follows:

$\Delta f_1^2 = k^2x\cos^2\phi$
$\Delta f_2 = -kx\sin \phi$;
$\Delta f_2^2 = k^2x\sin^2\phi$
$\Delta f_1^2 + \Delta f_2^2 = k^2 (\sin^2\phi + \cos^2\phi) = (2vf_o/c)$
since
$\sin^2\phi + \cos^2\phi = 1$.

Whereby v which is the sole unknown quantity can be calculated from above independently of the angle $\phi$.

Thus the present invention makes it possible by using the Doppler principle to determine the speed independently from the angle. Thus the application of the instrument has no critical significance at all. The movement of the vessel during the measurement which causes a change in the direction of sound toward the vessel also has no influence upon the measuring.

The present invention is usable specifically for measuring the flow of blood. However, it is also usable in the same manner for technical purposes, such as the measuring of speed of media flowing in flexible hose.

According to a further feature of the invention the values obtained from ultrasound receivers are treated electronically, namely the above-mentioned calculations are carried out by a calculator, so that the desired result is immediately available and specifically measured variations in speed can be quickly determined.

It is within the scope of the present invention to replace a separate sender and receiver in each device by a single electro-acoustic converter operating alternately as a sender and as a receiver. If each device contains a separate sender and receiver, they are placed one next to the other with about the same sending or receiving direction.

The invention will appear more clearly from the following detailed description when taken in connection with the accompanying drawing, showing, by way of example only, a preferred embodiment of the inventive idea.

In the drawing:

FIG. 1 illustrates diagrammatically, partly in section, the apparatus of the present invention in use;

FIG. 2 is a switch diagram of a device electrically calculating the measurements obtained by an apparatus of the present invention;

FIG. 3 shows an instrument of the present invention, partly in side view and partly in section.

FIG. 1 shows the outer surface 1 of the body of a patient, a blood vessel 2, the instrument 3 and two electro-acoustical piezo-electrical converters 4 and 5, each of which operates alternately as ultrasound sender and ultrasound receiver. The flow of blood in the blood vessel 2 is indicated by the arrow 2'. The senders-receivers 4 and 5 are so arranged in the instrument that their sending-receiving directions indicated by the double arrows 4' and 5' form an angle of 90°. Furthermore, the senders-receivers are so arranged in the instrument that the directions 4', 5' intersect each other at a desired distance $a$ below the lower edge 1' of the instrument. The drawing shows that the vessel to be examined is located at this distance below the body surface 1 and that the lower edge of the instrument is placed upon the surface 1 of the body. The angle between the direction of the rays of the ultrasound unit 4 and the flow direction 2' of the blood has been indicated at $\phi$. Therefore, the direction of rays of the sender-receiver 5 with the blood flow has the angle $90°-\phi$.

As shown in FIG. 2, the sender-receiver 4 is connected to the device 6 and the sender-receiver 5 is connected to the device 7. Each of the devices 6 and 7 contains a high frequency generator for exciting the corresponding sender with the sender frequency and a demodulator which transforms signals supplied by the corresponding receiver, which have a frequency shift relatively to the sender signals depending upon blood flow speed, into analogous signals ($\Delta f_1$, $\Delta f_2$) suitable for treatment in the calculator 8. Each of these analogous signals is transmitted through a conduit 9 or 10 to a squaring member 11 or 12 in the calculator 8 and it is squared therein (into $\Delta f_1^2; \Delta f_2^2$). The outgoing signals of the squaring members 11 and 12 are transmitted through conduits 13 and 14 to an adding member 15 in which they are added /$\Delta f_1^2 + \Delta f_2^2$). The outlet of the adding member 15 is connected to the root extracting member 16 in which a square root of the summed signal is produced $\sqrt{\Delta f_1^2 + \Delta f_2^2}$). The divider 16' divides the result by the constant $2f_o/c$. This step also carries out the calibration of the apparatus. The outlet of the member 16' also constitutes the outlet of the calculator and is connected to an indicating device 17 which indicates the speed of the blood flow and, if desired, inscribes the indicated values.

The boxes of FIG. 2 indicating the individual electronic steps contain inscriptions showing the formulae involved in the calculations.

FIG. 3 shows in greater detail the instrument shown only diagrammatically in FIG. 1. As also indicated in FIG. 1, the two senders-receivers 4 and 5 are so mounted in the cylindrical body 3 that the directions of their rays form a right angle with each other. The ray emitting surfaces of the two ultrasound senders-emitters 4 and 5 are located in a space 19 closed by a diaphragm 18 and filled with a liquid, such as water, so that the emitted ultrasound and the received ultrasound both pass through the liquid in the space 19. When the instrument is placed upon the surface of a body, the diaphragm 19 adapts itself to the body surface, so that the ultrasound senders-receivers 4 and 5 will be coupled by the liquid to the body of the person being examined. The ultrasound senders-receivers 4 and 5 are connected by a cable 20 with the devices 6 and 7 (FIG. 2). A suction cup 21 connected with the casing 3 is used to attach the instrument to the body surface of a patient. Furthermore, the casing 3 can be provided with a diametrically extending slit 22 containing a belt which can be used for attaching the instrument to the body of the patient. Finally, it also is possible to use glue for attaching the instrument to the body surface which is being examined.

If the two senders are operated with the same frequency, it is advisable to use the so-called counter-contact impulse drive wherein the senders-receivers 4 and 5 operate alternately, in order that no disturbing echoes should extend from one sender-receiver system into the other one.

Another type of decoupling which can be used for continuous line measurements, consists in that the individual systems operate with different frequencies (for example, 5 MHz and 7 MHz). However, this arrangement makes it necessary prior to the calculated amalgamation of the two frequency shiftings $\Delta f_1$ and $\Delta f_2$ to lower that value which was produced by the system having a higher sender frequency, for example, by voltage division in relation to the sending frequency. The switch diagram of FIG. 2 indicates this by showing by broken lines a division device 10' which, of course, could be combined with the device 10.

According to a further feature of the present invention, it is possible to use only one electro-acoustical converter (4, 5) for each sender-receiver system and yet to provide continuous line operations. In that case, however, a high output of the sender frequency $f_o$ will lie at the inlet of the receiving amplifier, as well as a very small output of the receiver frequency $f_d$. The two frequencies lie comparatively close to each other, so that a beat is produced whereby the sender frequency acts as the carrier frequency which is modulated with $\Delta f = f_o + f_d$. This frequency mixture is rectified by a switched in diode, whereby the pre-voltage will correspond to about the amplitude of the sender frequency and thereafter only the modulated voltage will remain which as an analogous value can be used as a basis for the further calculating process.

A further embodiment of the present invention consists in that a single instrument containing two sender-receiver systems can be used for measuring different depths $a$ if at least one of the two systems is mounted movably in the direction of the straight line connecting the two systems, while the 90° angle position of the two systems remains unchanged. Many solutions are available for carrying out this movement and they are all included in the framework of the present invention. Specifically the devices can move upon slides or in dovetailed guides. The shifting can be advantageously carried out by a rotary pin which can be combined with a gauge indicating directly the set value of $a$.

I claim:

1. An apparatus for measuring the speed of flowing media, particularly that of blood, by the use of ultrasound according to the Doppler principle method, said apparatus comprising a double ultrasound measuring system, each of said systems having a sender-receiver, the sending-receiving directions of said systems converging at an angle of 90° to each other, and an electronic calculator connected with said systems for calculating the measured difference frequency between the emitted and received frequency of each of said systems, said calculator comprising two squaring members for simultaneously and separately squaring the electric voltages corresponding to difference frequencies, an adding member for adding the squared voltages, a root extracting device for calculating the square root of the added voltages, and an adjustable dividing member, said members being interconnected in the stated order, said dividing member comprising an outlet for an indicator.

2. Apparatus in accordance with claim 1, wherein said double ultrasound measuring system comprises shifting means for shifting at least one of said systems relatively to the other system in the direction of a straight line connecting the two systems.

* * * * *